T. C. ROBERTS.
METHOD OF AND APPARATUS FOR MAKING PHONOGRAPH RECORDS.
APPLICATION FILED NOV. 4, 1919.

1,358,577.

Patented Nov. 9, 1920.

Inventor,
Theodore C. Roberts

By
W. Laird Goldsborough, Attorney.

UNITED STATES PATENT OFFICE.

THEODORE C. ROBERTS, OF BRIDGEPORT, CONNECTICUT.

METHOD OF AND APPARATUS FOR MAKING PHONOGRAPH-RECORDS.

1,358,577. Specification of Letters Patent. Patented Nov. 9, 1920.

Application filed November 4, 1919. Serial No. 335,701.

*To all whom it may concern:*

Be it known that I, THEODORE C. ROBERTS, a citizen of the United States, and residing at Bridgeport, county of Fairfield, State of Connecticut, have invented certain new and useful Improvements in Methods of and Apparatus for Making Phonograph-Records, of which the following is a full, clear, and exact description.

In the manufacture of phonograph records it is customary to place a mass of hot, plastic record material upon the surface of a thin copper disk matrix which is backed by soft metal and rests upon the lower of two heated dies of appropriate size, squeeze the mass between the matrix and a correspondingly backed matrix against the upper of the two dies until the record has been formed, and immediately cool the die to harden the record material so as to permit its removal from the dies. The repetition of these operations requires that the dies be quickly and uniformly heated and cooled for each impression, involving many hundreds of cycles with as short intervals as possible. The heating is ordinarily done by steam and the cooling ordinarily by cold water. Heretofore it has been the practice to conduct the heating and cooling fluids directly through one or more passages provided in the body of the die.

The time element involved of course directly affects the labor cost for manufacture and the quantity of steam and water used have represented items of considerable expense. My invention is designed to save in both of these as well as secure a more uniform and desirable product, and I accomplish this by spraying the heating and cooling fluids against the die close to the operative surface thereof. Broadly speaking the invention, therefore, which constitutes the subject matter of this application, relates to a process and an apparatus whereby the heating and cooling of the plastic material is effected by spraying, the advantages of which will more fully appear in the detailed description below taken in connection with the accompanying drawings, in which—

In the drawings similar numerals indicate similar parts.

Figure 2:
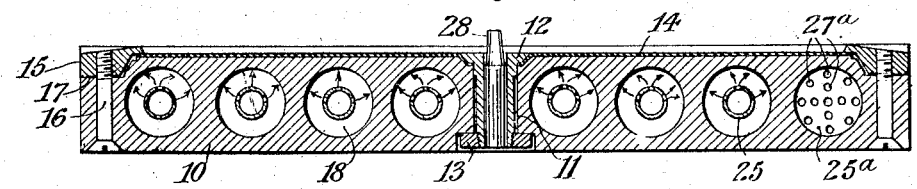
Fig. 2 is a section taken on line 2—2 of Fig. 1.

The body of the die 10 which is usually made of steel is provided with a central opening 11 in which is fitted a clamping bushing 12 which is threaded to receive a clamping nut 13. A matrix 14 is centered and held on the die 10 by means of the clamping means just described. The matrix, it will be observed, has a central opening to receive the bushing 12 and its contour adjacent said opening is complementary to that of the die and bushing. The matrix is clamped at its outer rim by an annular clamping means comprising a ring 15 and screws 16. The ring has a suitable seat 17 as shown in Fig. 2. The manner of clamping the matrix to the die, however, is not essential to the invention described more in detail hereinafter.

The body of the die is tunneled by a series of channels or passages 18 arranged as close to the surface of the die as possible to facilitate the rapid heating and cooling of the same. Heating and cooling fluids are conducted to said channels by means of the inlet header 19 which latter is connected by a suitable piping 20 to a source of hot and cold fluids. A valve 21 is provided for admitting the heating and cooling fluids to the channels 18. The outlet ends of said channels 18 are connected to an outlet header 22 which in turn is suitably connected to a waste pipe 23.

Figure 1:
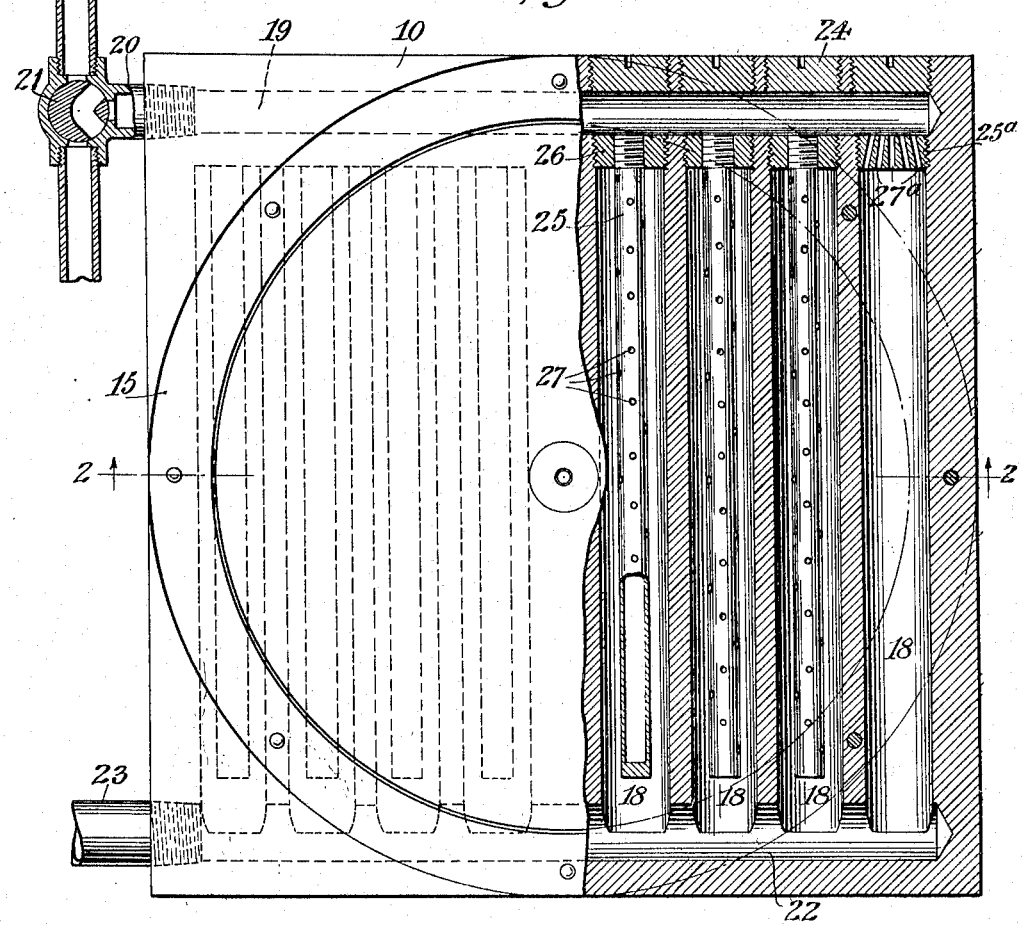
Figure 1 is a top plan view of the die, parts being broken away.

As shown in Fig. 1, the channels 18 are formed by drilling into the body of the die and the entrance holes subsequently closed by plugs 24. The inlet and outer headers are also shown as made by drilling. The parallel arrangement of the channels 22 while making for cheap construction is not essential. They may be in the form of concentric circles or in spirals as shown in the prior art. Channels which are round in cross section, however, are preferable because of ease of making the same and also because of the arch-like support (see Fig. 2) offered to the die surface by the remaining material.

One of the more important features of this invention, however, resides in the fact that the heating and cooling fluids are sprayed into the channels 18. The term "spray" or "spraying" will be used for convenience in the description and claims as meaning a plurality of jets. This spraying may be effected in a number of ways. In Fig. 1 I have shown two constructions for accomplishing this result. A perforated tube or pipe 25 of less diameter than its channel is secured at its open end to an internally threaded member 26 which latter is screwed into the body of the die. This forms a simple means for securing the tube in place but it is obvious that other means may be employed for that purpose. The perforations in the tube are indicated by numeral 27. Preferably that side of the pipe remote from the die surface is not perforated. This permits concentration of the sprayed fluid on the die-surface side of the channels.

As an alternative method of spraying the channels, I may employ nozzles 25$^a$ having openings 27$^a$ therein arranged at angles to the channel walls. The fluid when sprayed through the perforated nozzles 25$^a$ tends to pass through the channels in the form of eddies with a resultant thorough contact of all the particles of fluid with the walls of the channels.

When live steam is allowed to enter the heating system through the control valve 21 it has free passage into tubes 25 through the inlet header 19. It issues from the tubes 25 through the perforations 27 and strikes the walls of the channels at angles substantially right angles thereto. The molecules of steam are thereby caused to bombard the walls of the channels and as a result not only come into intimate contact therewith but act as an agency for the instant removal of any water of condensation collected thereon, which would otherwise be present in the form of a thin sheet or film. This bombardment does not cease until the steam has condensed. Then it passes along to the outlet header 22 through the waste pipe 23. By reason of fact that the steam is sprayed at angles to the length of the channels all of the vapor molecules will have the maximum amount of heat energy extracted therefrom. My invention of spraying the steam at angles to the channel therefore, makes possible the more complete utilization of the heat energy of the steam than is possible by the system for heating heretofore known, and hence the heating can be affected quicker and at less expense than formerly.

In cooling the die the advantages of spraying the cold water at angles to the walls of the passages are as equally well marked as when heating the die. The jets of water impinging on the walls of the passages come into intimate contact therewith and consequently every particle of water extracts the maximum amount of heat from the walls of the passages. A saving in water and time required to cool the die surface is thereby effected.

The upper and lower dies are substantially alike except that the lower die is provided with a pin at the center for fitting within a recess in the upper die. This pin, indicated by neumeral 28, fits within the bushing 12 previously described and has its upper end projecting above the plane of the matrix 14 whereby to define the central hole in the finished record and to fit in the opening in the upper die (not shown).

It is expressly understood that I do not limit myself to the exact construction herein illustrated and described as many changes may be made in points of detail and other embodiments resorted to without deviation from the true spirit and scope of my invention as defined by the appended claims.

Having thus described my invention what I claim as new, and desire to secure by Letters Patent is:

1. In combination, a die for shaping thermoplastic materials comprising a body having a plurality of tunnels adjacent the die surface thereof, and means permitting the spraying of fluid against the walls of the tunnels.

2. In combination, a die for shaping thermoplastic materials comprising a body having a plurality of tunnels adjacent the die surface thereof, and fluid conductors within said tunnels having a plurality of linearly extending openings therein whereby fluid may be sprayed against the walls of said tunnels.

3. In combination, a die for shaping thermoplastic materials comprising a body having a plurality of tunnels adjacent the die surface thereof, and fluid conductors within said tunnels having a plurality of openings on the die surface side only whereby the tunnel walls nearest the die-surface may be sprayed with fluid.

4. In combination, a die for shaping thermoplastic materials comprising a die body having a plurality of uniformly spaced tunnels close to the die-surface thereof, and fluid conductors within said tunnels having a plurality of openings therein permitting the spraying of fluid against the die surface side of the tunnel walls.

5. In combination, a die for shaping thermoplastic materials comprising a die body having a plurality of tunnels close to the die surface thereof, inlet and outlet headers connecting the respective ends of said tunnels, and perforated fluid conductors secured at the inlet entrance to said tunnels.

6. The method of heating and cooling a die for shaping thermoplastic materials which consists in spraying heating and cooling fluids alternately along the same path of multiple paths which are uniformly spaced and close to the die-surface thereof.

7. A pressing die for shaping themoplastic material, comprising a hollowed body portion having an inner surface adapted to undergo temperature change, and perforated fluid-conducting means carried therein and spaced from the surface, but in proximity thereto, and having the perforations directed toward the surface to spray a heating or cooling fluid thereon.

8. A pressing die for shaping thermoplastic material, comprising a hollowed body portion having an inner surface adapted to undergo temperature change, and perforated fluid-conducting means fixed and stationary relative to the surface, said means being spaced from, and adapted to spray a heating or cooling fluid upon, the surface.

9. A pressing die for shaping thermoplastic material, having an inner surface adapted to undergo temperature change, and perforated fluid-conducting means fixed and stationary relative to the surface, said means being spaced from, and adapted to spray a heating or cooling fluid upon, the surface, and means adapted to confine the spray to a plurality of spaced areas.

10. A pressing die for shaping thermoplastic material, having an inner surface adapted to undergo temperature change, and perforated fluid-conducting means fixed and stationary relative to the surface, said means being spaced from, and adapted to spray a heating or cooling fluid upon, the surface, said die being channeled in surrounding and spaced relation to the fluid-conducting means.

11. A disk pressing die for shaping thermoplastic material, comprising a body portion hollowed adjacent the die surface thereof, means carried therein permitting the spraying of fluid within the hollow portion and against the wall adjacent the die surface, and a central bushing extending through the die transversely to the plane of the die surface.

12. A pressing die for shaping thermoplastic material, comprising a body portion hollowed adjacent the die surface thereof, means carried therein for spraying of fluid within the hollow portion and against the wall adjacent the die surface, a central bushing extending through the die transversely to the plane of the die surface, and a solid portion of the body portion surrounding said bushing.

13. A pressing die for shaping thermoplastic material, comprising a body portion hollowed adjacent the die surface thereof, and means carried therein disposed in a plane substantially parallel to the die surface, permitting the spraying of fluid within the hollow portion and against the wall adjacent the die surface.

14. A disk pressing die for shaping thermoplastic material, comprising a body hollowed adjacent the die surface thereof, and perforated fluid-conducting means adjacent the die surface and adapted to spray the interior surface of the hollow body, said means extending along spaced paths.

In testimony whereof, I affix my signature.

THEODORE C. ROBERTS.